United States Patent

[11] 3,537,568

[72] Inventor John M. Leach
P.O. Box 341, Port Jefferson, New York 11777
[21] Appl. No. 790,239
[22] Filed Jan. 10, 1969
Continuation-in-part of Ser. No. 765,250, Oct. 4, 1968, Patent No. 3,537,569
[45] Patented Nov. 3, 1970

[54] ARTICLE HANDLING CONVEYORS
10 Claims, 3 Drawing Figs.
[52] U.S. Cl. .................................................. 198/127
[51] Int. Cl. ............................................... B65g 13/02
[50] Field of Search .......................................... 198/34, 127, 160

[56] References Cited
UNITED STATES PATENTS
3,420,355 1/1969 Good ........................... 198/127
Primary Examiner—Edward A. Sroka ABSTRACT: This invention relates to an article handling conveyor of the accumulation type in which the accumulation function is accomplished rapidly, smoothly, always under positive control, and with the accumulated articles in a solid line where desired with no pressure between them. This is accomplished by stopping the forward movement of each article undergoing accumulation in two stages. The first stage primes the article movement stopping mechanism for final operation and is activated by the presence of an article in the path of the article to be stopped. The second and final stage is activated by the article to be stopped when it reaches a predetermined position.

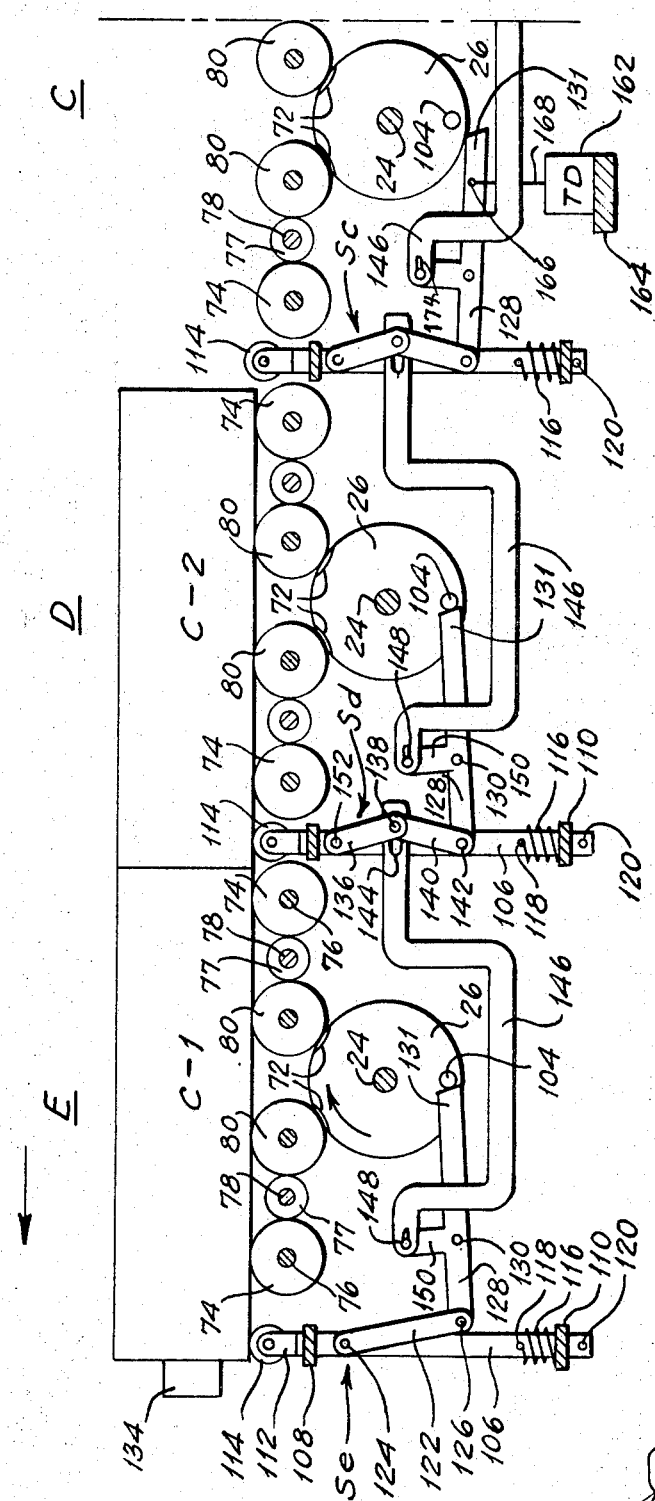

Patented Nov. 3, 1970
3,537,568
Sheet 2 of 2
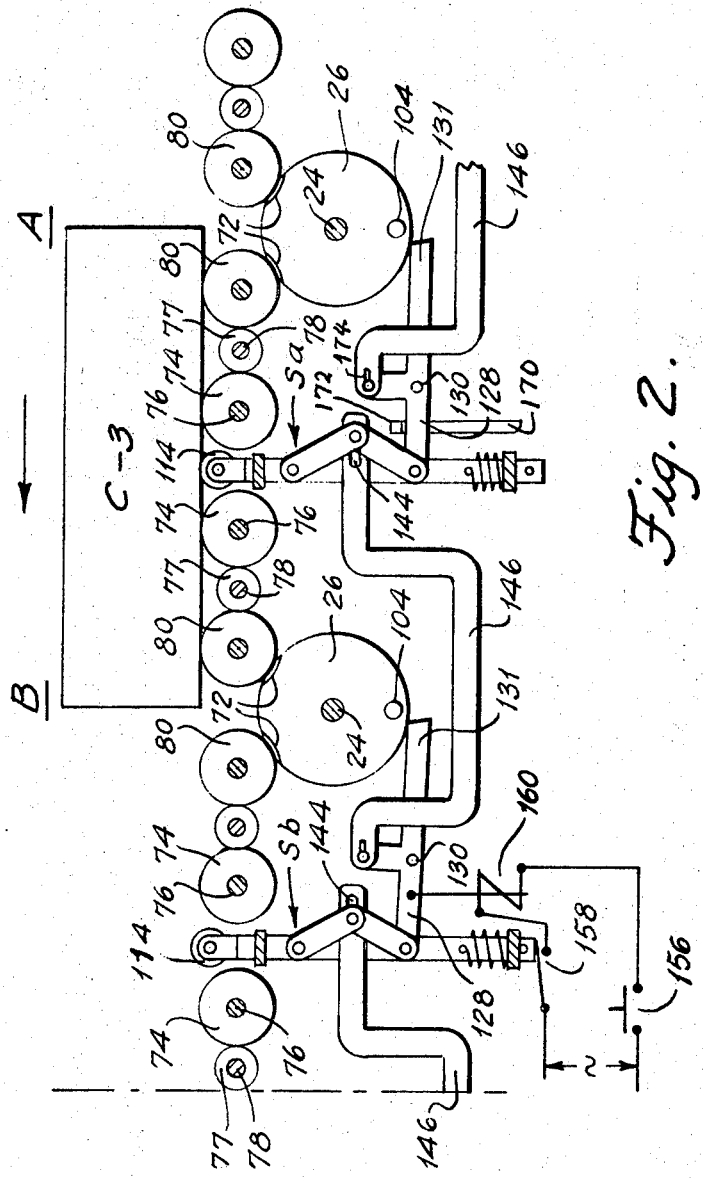
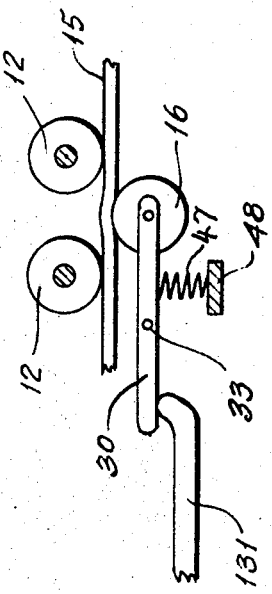
INVENTOR.
John M. Leach

ARTICLE HANDLING CONVEYORS

This application is in part a continuation of U.S. Pat. application Ser. No. 765,250, filed Oct. 4, 1968, now U.S. Pat. No. 3,537,569, for Article Handling Conveyors.

It is an object of the present invention to provide an accumulation conveyor in which the moving force applied to the articles being accumulated is applied to all of the article substantially until the article is stopped.

In accumulation conveyors heretofore known the article-stopping sensing means being actuated by an article at any time is not effective to stop the article actuating the sensing means but to stop the next approaching article when it arrives at the article-stopping area controlled by that sensing means. Also, each article-stopping sensing means is located at or near the extreme downstream end of the article-stopping area in which it is located which is in effect a dead area. This means that each article while being stopped must be pushed nearly all of the distance across the dead area which is intended to stop it and then hopefully coasted for some distance before it depresses the sensor which will then cut off the driving force which moved it into the dead area so as to stop it and have it in turn create a dead area behind it to stop the next article and so on.

The result is many articles do not make it sufficiently across the dead area to operate the intended sensor but stop short of the sensor and not only leave an unwanted space, since accumulation conveyor space unused is an economic loss, but also stop on the wrong sensor which creates an unwanted dead area further upstream to create more wasted space and also leave a driving area which is doing no good and further wasting space.

To overcome this articles are many times moved into a dead space at an excessively high speed to be certain that they get across with the result that they slam into the stopped articles ahead with damaging force which to a large extent nullifies the value of an accumulation conveyor.

It is only by sheer happenstance that a series of articles can be moved into solid line accumulation without some or all of the above conditions coming about.

It is another object of the present invention to provide an accumulation conveyor which overcomes all of the above described shortcomings in present accumulation operations.

It is a further object of the present invention to provide an accumulation conveyor which will arrange successive articles in a solid line accumulated state without pressure between the articles.

It is another object of the present invention to provide an accumulation conveyor which will always move articles out of the accumulated state one at a time leaving a space between them, sometimes termed "singulation", so as to facilitate some following operation.

It is still another object of the present invention to provide an accumulation conveyor which will receive articles either one at a time or in groups and uniformly arrange them in an accumulated state either in a solid line without interpressure or with a uniform desired space between them.

It is a further object of the present invention to provide an accumulation conveyor in which the stopping of each article incidental to the accumulation operation is performed in two stages, a priming stage for the stopping mechanism and a second final stopping stage.

Other objects and advantages will become apparent to those skilled in the art upon recourse to the following specification and the accompanying drawings, in which:

FIG. 1 is a skeletonized side elevational view of an accumulation conveyor made in accordance with the present invention;

FIG. 1A is a continuation of FIG. 1; and

FIG. 2 is a fragmentary side elevational view of an accumulation conveyor made in accordance with the present invention and involving a different form of article starting and stopping device.

The present invention is shown as being applied to a live roller-type of conveyor but it is to be understood that the invention can with equal facility be applied to other types of conveyors, such, for example, to skate wheel conveyors.

The conveyor frame and power drive, within themselves, form no part of the present invention and have been omitted from the drawing in order to more clearly show the subject matter of the novel features. A typical frame structure is shown in U.S. Pat. No. 3,400,806.

The accumulation conveyor of the present invention comprises a typical frame as described above (not shown) which supports a series of power-driven operative sections which can be of any desired number but for the purpose of disclosure have been limited to A through E and which move the articles being conveyed along in a streamflow in the direction shown by the arrows in FIGS. 1 and 1A. All of these operative sections are of identical construction except the end section E which differs slightly from the others as will be explained later.

Each of these power-driven operative sections comprises the same elements which function in exactly the same manner as the corresponding operative sections disclosed in U.S. Pat. application Ser. No. 765,250 but only the friction wheel 26 suitably supported by the shaft 24 and carrying the stud 104 and the rollers 80 driven by the friction wheel 26 and the rollers 74 driven by the interdriving wheels 77 have been shown in order to avoid crowded drawings herein. The supporting shafts 24, 76 and 78 are suitably supported from the frame as explained in that application.

Each power-driven operative section is provided with an article sensor Sa through Se, each of which comprises a slide 106 guided in guides 108 and 110 suitably supported by the frame. Each slide 106 is provided at the top with a yoke 112 which carries a rotatably mounted wheel or roller 114. Each slide 106 is also provided with an encircling compression spring 116 which bears against the guide 110 at its bottom and a pin 118 at the top to normally maintain the slide in a raised position in which a pin 120 is in contact with the bottom of the guide 110 and the tops of the elements 114 extend slightly above the tops of the rollers 74 and 80. An arm 122 is suitably pivoted at 124 to the slide 106 and at 126 to a stop arm 128 suitably pivoted at 130 to the frame.

With this arrangement and when the slide 106 is in raised position under the force of spring 116, the friction wheel 26 will be rotated by the powered driving member and V-pulley as described in U.S. Pat. application Ser. No. 765,250 and will through frictional contact rotate rollers 80 which through intermediate wheels 77 rotate rollers 74 so as to act as supporting and moving elements for articles being conveyed.

When an article such as carton C-1 moves into the power driven operative section E it will be moved along by the rollers 74—80 until it depresses the roll 114 and the slide 106 which will through arm 122 rotate arm 128 so as to move its end 131 up into position to contact pin 104 and stop wheel 26 which will stop rollers 74—80 and thus stop further movement of the carton C-1.

When section E marks the end of the conveyor system a gate or stop such as 134 is usually placed in position so as to prevent carton C-1 from accidentally being knocked off the end of the conveyor.

Article sensor Se, which is the last one on the conveyor, differs from the other sensors, for example Sd in that in the case of Sd the relatively long arm 122 is replaced by a shorter arm 136 which instead of being pivotally connected to the stop arm 128 is pivotally connected at 138 to a second short arm 140 which is pivotally connected at 142 to the stop arm 128. The pivotal connection pin 138 has an end extended so as to be slidable in a slot 144 carried by an arm 146 which is pivoted at 148 to an arm extension 150 carried by the arm 128 of section E.

When the Carton C-1 depressed roll 114 at the downstream end of section E and as explained above raised the end 131 of the section E arm 128, the counterclockwise rotation of the arm extension 150 moved the arm 146 to the left so that the right-hand end of slot 144 was resting against the pin 138 extension. At this time nothing further happened but the movement of the arm 146 and the consequent positioning of the left end of the slot 144 up against the extension of pin 138 constituted a priming action which placed the stopping mechanism of section D in condition for a second or final stopping action. This priming action was brought about by the presence of carton C-1 which would block movement of the next carton into section E. At this time the slide 106 of section D remains in the raised position, and the rollers 74 and 80 of section D as well as of all of the other sections except E continue to rotate.

When carton C-2 comes along and enters section D it will continue to be driven by the rollers 74 and 80 of section D until it depresses roll 114 of S$d$ which will depress the slide 106 of S$d$ against the pressure of spring 116 which will move the top of the short arm 136 where it is pivoted to slide 106 at 152 downwardly along with slide 106. If the slot 144 of arm 146 had not been moved to the left through the presence of carton C-1 in section E as above explained, which was the priming stage for the two-stage stopping action for section D, which would place the slot 144 in the position shown for sensor S$b$, this downward movement of short arm 136 of S$d$ would have merely caused the two short arms 136 and 140 to fold together by moving the extended end of pivot 138 to the right in slot 144 to the same position as that shown for the two short arms 136 and 140 of S$a$. This is because the pivot point of arms 128 shown at 130 is selected so that the end 131 is sufficiently longer than the opposite end to be heavy enough to counterbalance the small force it takes to fold the two short arms 136 and 140 together and move the pin 138 to the right in the slot 144 as shown for S$a$. Under this set of conditions nothing more would have happened or the second or final stopping stage for section S$d$ would have been inoperable as far as moving arm 128 is concerned and of no effect as is exactly the condition existing at S$a$ for section A which is correct for section A because there is no carton immediately downstream of C-3 in section B which could have primed S$a$ for the final stopping action of section A.

Now, coming back to section D and carton C-2, because the presence of carton C-1 in section E did prime S$d$ by moving the slot 144 to the left as above explained and arm 146 of section E is prevented from moving to the right by the continued presence of carton C-1, the short arms 136 and 140 of S$d$ cannot fold together because their pivot pin 138 is held from movement by being tight up against the right end of the slot 144 of S$d$. The arms 136 and 140 are therefore caused to move downwardly with slide 106 and the pivotal connection 142 between arm 140 and stopping arm 128 causes the end 131 of arm 128 to move up into the path of stud 104 and stop wheel 26 and rollers 74 and 80 of section D exactly as explained above for section E. It will be noted that the arm 146 of section E was free to rotate slightly about its pivot 148 during the downward movement of slide 106 of S$d$. The second or final stopping stage for section D will thus be completed.

It will be noted that the movement of arm 128 explained above caused movement of arm extension 150 of section D which in turn moved the arm 146 connected to it to the left and thus moved the slot associated with S$c$ to the left so as to prime S$c$ of section C for a final stopping action when the next carton C-3 reaches roll 114 of S$c$. This priming the upstream section for final stopping action when a carton reaches its sensor will obviously continue until the furthermost upstream section is stopped if that many cartons are fed onto the accumulation conveyor.

During the very short time it took the final stopping action for section D after carton C-2 depressed roll 114 of S$d$ to be completed as explained above, the carton C-2 moved into gentle contact with carton C-1 and all driving pressure between C-1 and C-2 ceased as soon as the rollers 74 and 80 of section D stopped rotating. This action will obviously be repeated in upstream sections as succeeding cartons come to rest.

It will be noted that under the solid carton line accumulation just described, there is no pressure being created between any cartons at any time because no driving action will take place upon any carton at any time as long as no carton is removed at any point from the line.

If it is desired that some space be left between cartons while they are in the accumulated state, for example, so that some work such as stenciling can be performed upon them, it is only necessary to make each power-driven operative section sufficiently longer than the prevailing carton length to cause each carton to stop after depressing the roll 114 which is to stop it before it contacts the preceding carton. This is done by adding more rollers 74 where needed.

It will be noted that instead of or in addition to cartons, any other desired type of object can be accumulated by the conveyor of the present invention.

When the end carton C-1 is removed from the conveyor, the compressed spring 116 will raise the slide 106 of S$e$ which will raise the arm 122 and rotate the stopping arm 128 of section E which will cause the rollers 74—80 of that section to start to rotate. The arm 146 of that section will be moved to the right so as to move its slot 144 to the right which will allow the short arms 136—140 of S$d$ to fold together under the force of the long end 131 of stopping arm 128 of section D tending to rotate arm 128 clockwise. This will cause the end 131 to release stud 104 of wheel 26 of section D which will start rotation of rollers 74—80 of section D which will move carton C-2 into section E where it will eventually depress roll 114 of section E and again stop rotation of rollers 74—80 of section E and again prime S$d$ to stop the rotation of rollers 74—80 of section D when the next following carton compresses roll 114 of section D.

It will be noted that the cartons always move from one section to the next with some space between them because the startup of rotation of the rollers 74—80 of succeeding sections is in sequence and not simultaneous because of the lost motion in the connecting linkage and in the driving assemblies for the wheels 26.

It is at times desirable to dispense with a gate such as 134 and merely stop a lead article at a selected point and accumulate a given number of articles behind it for release to some operation such as palletizing. This can be done by selecting the desired point which for illustration purposes will be section B. A start-stop switch 156 can be placed at any desired control point or panel and a limit switch 158 will be mounted for operation by the slide 106 of S$b$. The two-series connected switches will be included in circuit with a solenoid 160 which when energized by a first closing of switch 156 and a later closing of limit switch 158 by depression of roll 114 of S$b$ by a carton will rotate stopping arm 128 until its end 131 stops stud 104 of wheel 26 of section B and thus stops the carton in this section. Following cartons will then accumulate behind the stopped carton in the same manner as explained above.

When the switch 156 is opened the solenoid 160 will be deenergized so as to release arm 128 and as above explained start rotation of rollers 74—80 of section B which will move the stopped carton out of section B and on into the using operation followed by the remaining cartons in the accumulated group with spaces between them.

In some operations it may be desirable to create definite predetermined length spaces between successive articles leaving the accumulation group, for example several feet. This can be done by attaching the plunger shaft 168 of an adjustable time delay 162 to each arm 128 of each section following the controlled stop section as shown at 166 in section C. The time delay body is mounted on a member 164 suitably attached to the frame.

The time delay is of the type which offers no resistance to the movement of end 131 of arm 128 into position to stop its associated stud 104 but will delay the release movement of end 131 for a definite time which is adjustable. This time when selected relative to the speed of the conveyor will establish definite distances between articles as they are released from the accumulated state. These time delays in and of themselves form no part of the present invention and are available on the open market.

It is at times desirable for the rollers 74—80 to continue to rotate for a short time under the momentum of the supported article after the driving wheels 26 are stopped. This can be of advantage, for example, when many different lengths of articles are being accumulated. This can be accomplished by providing the tread of each wheel 26 with two shallow cutout areas 72 positioned so as to each be adjacent a roller 80 when the stud 104 is stopped by an arm end 131.

It will be noted that when articles such as carton C-3 are moving along the conveyor prior to depressing a sensor such as Sc which has been primed for a stopping action, passage over all unprimed sensors such as Sa does not cause stoppage of any rollers 74 and 80 but merely folds the arms 136 and 140 together without rotating the arm 128. This eliminates unnecessary operation of the stopping mechanisms and thus reduces wear.

It will also be noted that any article can be removed from an accumulated group and the following upstream articles will automatically move one by one and eliminate the space.

The accumulation conveyor of the present invention has thus far been considered as being provided with article-moving and stopping mechanism of the type disclosed in U.S. Pat. No. 3,400,806.

It can with equal facility be applied to conveyors having many other types of article-driving and stopping mechanism, such, for example, as that shown by U.S. Pat. No. 3,012,652. Such an application is shown diagrammatically in FIG. 2, in which a powered propelling member in the form of a flat belt is shown at 15. Belt 15 is held up into driving contact with article-supporting and moving rollers 12 by pressure rollers 16 carried by arms 30 suitably pivotally mounted on some fixed part of the unit as at 33. A compression spring 47 suitably carried by a frame section 48 bears upwardly against arm 30 to force the belt 15 into contact with the rollers 12. In this type of application the end 131 of stopping arm 128 instead of stopping a stud 104 moves the arm 30 clockwise against the pressure of spring 47 to lower the roller 16 and thereby cause the belt 15 to disengage the rollers 12 and thus stop rotation of these rollers and discontinue driving movement of the articles carried by such rollers 12. It will be understood that the operation of all of the other elements associated with arm 128 will be the same in this application as in the above-described application. The accumulation conveyor of the present invention can likewise be applied to the article-moving and stopping apparatus shown by U.S. Pat. No. 3,062,359 as well as many other types.

It is to be understood that a simple hand or foot-operated mechanical stop can be used in place of the solenoid 160 where such is desired. Such a stop is shown in section A and may consist of an arm 172 carried by an upright 170 which can be attached to any desired hand or foot-operated lever to move arm 172 downwardly when pressed so as to rotate arm 128 until its end 131 stops stud 104.

Suitable stops (not shown) will be placed so as to hold the arms 128 when inoperative in a position where the ends 131 are just below and not touching studs 104.

It will be noted that each arm 128 and its respective cooperative stud 104 constitute a stopping means for the section in which they are located.

It will also be noted that when an electrical sensor operated switch and solenoid as shown at 158 and 160, respectively, are used the stopping-means actuator is single stage.

In the event only a slightly increased delayed action between the startups of successive sections is desired, such can be accomplished by substituting short slots 174 at the pivotal connections 148 instead of holes.

When a stopping means is operated in a single stage as in section E, the arm 146 is also directly connected to the sensor slide 106 by arm 122, the left end of arm 128 and arm extension 150.

When a stopping means is normally operated in two stages as in section B but can be operated in a single stage by electrical means, the arm 146 is directly connected for operation by the sensor Sb by the limit switch 158, solenoid 160, the left end of arm 128 and the arm extension 150.

The foregoing is to be considered as descriptive and not limitative because many modifications, changes and substitutions can be made in the structure disclosed without departing from the spirit of the invention which is defined in the appended claims.

I claim:

1. An article accumulation conveyor comprising a multiplicity of power-driven operative sections for the purpose of moving articles from one to another in a desired direction of article streamflow, an article operable sensor located near the downstream end of each section, a section stopping means included in a section in a relative downstream position, connection means operable in a single stage between the sensor of said downstream section and said stopping means to stop said downstream section when an article moves thereon and contacts its sensor to thus stop said article, a section stopping means included in a relative upstream section, an operator mechanism for said stopping means of said upstream section comprising a final actuating means inoperably connected between said upstream section sensor and said upstream section stopping means and a priming means for rendering said final actuating means operable and connected to said downstream section stopping means to be operated simultaneously therewith to place said final actuating means in condition to operate said upstream section stopping means when the sensor of said upstream section is contacted by an article during the time another article remains on said downstream section to stop said upstream section and thus stop the article thereon from proceeding onto said downstream section while it is occupied by said other article.

2. An article accumulation conveyor as specified in claim 1 further characterized in that each of the relatively downstream sections is connected to its adjoining upstream section between the downstream stopping means and the upstream priming means as more particularly specified in claim 1.

3. An article accumulation conveyor as specified in claim 1 further characterized by the inclusion of an electrical means to operate the stopping means of one or more of said sections.

4. An article accumulation conveyor as specified in claim 3 in which each of said electrical means is controlled by the sensor of the section in which it is included.

5. An article accumulation conveyor as specified in claim 1 further characterized by the inclusion of a manually operated means to actuate the stopping means of at least one of said sections.

6. An article accumulation conveyor as specified in claim 1 further characterized in that each stopping means other than a single-stage stopping means includes a swingable arm and that said final actuating means comprises two arms pivoted together at one end of each with the opposite end of one arm pivotally connected to the movable sensor of the section in which it is located and the opposite end of the other arm pivotally connected to said swingable arm of the stopping means of said section whereby when said sensor moves the two arms can fold about their pivotal connection instead of transferring movement to said swingable arm.

7. An article accumulating conveyor as specified in claim 6 further characterized in that said priming means comprises a movable arm provided with a slot in which an extension of the pivotal connection for said two arms is seated for limited movement, the said slotted arm being movable into a position by the downstream section stopping means when it is actuated to restrain relative movement between said pivotally connected arms so that movement of the sensor to which one end of one of said arms is connected is transmitted through the said arms so as to actuate the stopping means to which the other end of the other of said arms is connected.

8. An article accumulation conveyor comprising a multiplicity of power-driven operative sections for moving articles from one to another in a desired article streamflow direction, an article operable sensor for each section located near the downstream end thereof, a section stopping means included in a relatively downstream section, means operatively connecting said stopping means to the sensor of said downstream section for section-stopping action by said last named sensor when an article is in contact therewith, a section-stopping means included in a relatively upstream section, connection means between said section-stopping means for said upstream section and the sensor of said upstream section which is operative to actuate said upstream section-stopping means when primed, and means operatively connected between said last named connection means and said downstream section sensor to prime said last-named connection means when said downstream sensor is contacted by an article.

9. An article accumulation conveyor as specified in claim 8 further characterized in that a connection is provided between said priming means and the stopping means of said downstream section.

10. An article accumulation conveyor as specified in claim 8 further characterized in that said downstream section sensor is also of the type which must normally be primed in order to actuate the stopping means of its section.